(No Model.)
W. L. T. KUECHEL.
CRIMPING TONGS.
No. 563,494. Patented July 7, 1896.
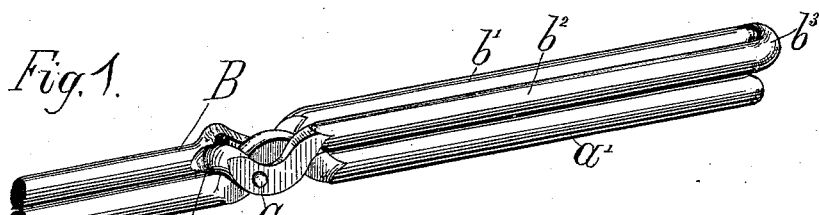
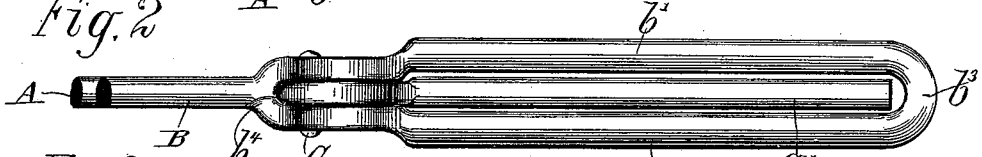
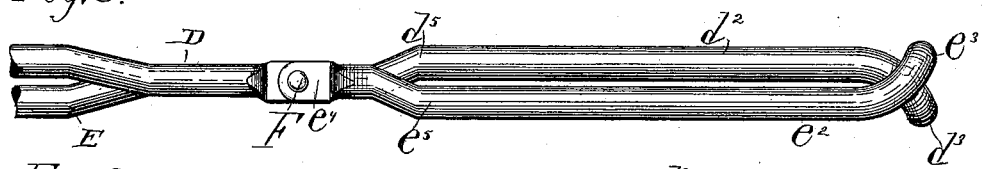
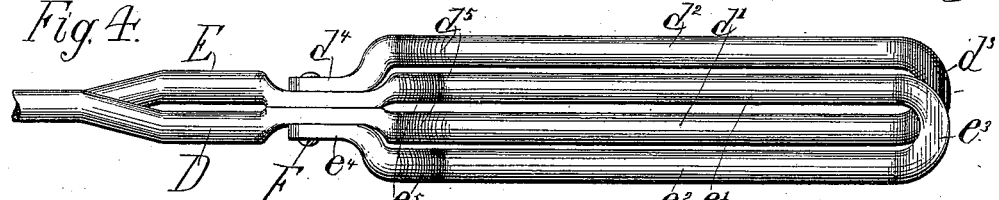
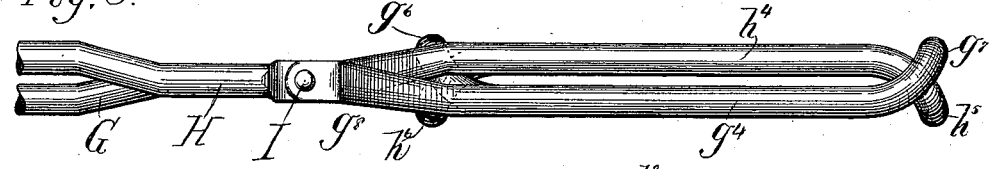
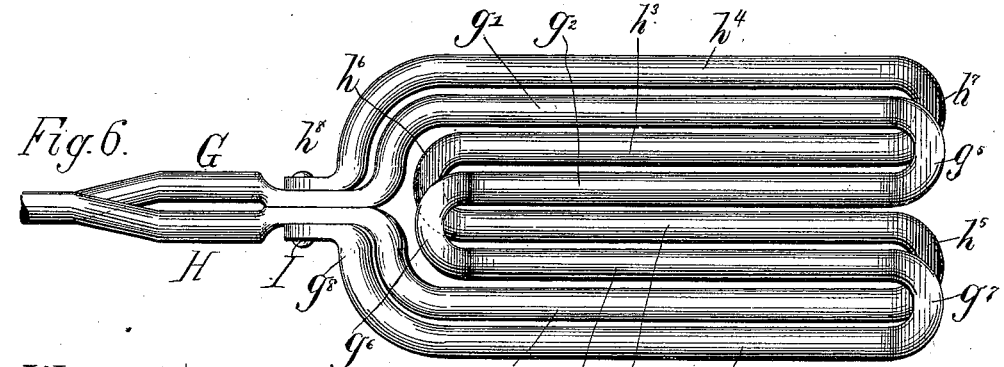
Witnesses
C. C. Tomlinson
Louis M. F. Whitehead.
Inventor
William L. T. Kuechel.
by Dayton, Poole + Brown Atty's

UNITED STATES PATENT OFFICE.

WILLIAM L. T. KUECHEL, OF CHICAGO, ILLINOIS, ASSIGNOR TO THE GEORGE L. THOMPSON MANUFACTURING COMPANY, OF SAME PLACE.

CRIMPING-TONGS.

SPECIFICATION forming part of Letters Patent No. 563,494, dated July 7, 1896.

Application filed July 15, 1892. Serial No. 440,142. (No model.)

*To all whom it may concern:*

Be it known that I, WILLIAM L. T. KUECHEL, of Chicago, in the county of Cook and State of Illinois, have invented certain new and useful Improvements in Crimping-Tongs; and I do hereby declare that the following is a full, clear, and exact description thereof, reference being had to the accompanying drawings, and to the letters of reference marked thereon, which form a part of this specification.

This invention relates to hair-crimping tongs, and has for its object to provide a simple, strong, and durable construction in such implements, while avoiding the necessity for welding and performing other expensive hand labor in manufacturing the same.

The invention consists in the matters hereinafter described, and pointed out in the appended claim.

In the accompanying drawings, Figure 1 is a perspective view of crimping-tongs embodying my improvement. Fig. 2 is a plan view thereof. Fig. 3 is a view in side elevation of tongs having four tines. Fig. 4 is a face view thereof. Fig. 5 is a view in side elevation of tongs having eight tines. Fig. 6 is a face view thereof.

As shown in Figs. 1 and 2, the crimper consists of two shanks A and B, forming the handles of the implement. The shank A is provided with a single tine $a'$, while the shank B is provided with two tines $b'$ $b^2$, arranged for the passage between them of the tine $a'$. Said shank B and the tines $b'$ and $b^2$ are made of one piece or length of rod bent to form both tines, which latter are connected with each other by a U-shaped bend $b^3$ at their outer ends. The two parts or members of the implement are connected by a pivot-pin C, inserted through the tines $b'$ $b^2$ near the shank and through the tine $a'$, also near its shank. For neatness of finish the inner end or extremity $b^4$ of the tine $b^2$, which extends past the pivot-pin C is bent inwardly into contact with the shank B; but this construction is employed in the instance illustrated merely to give a smooth finish to the parts and is not essential, as will be seen from the other figures of the drawings, which are without such inwardly-bent part $b^4$.

In the form of implement shown in Figs. 3 and 4 the two parts or members composing the same are each formed by shanks D E, having each two tines $d'$ $d^2$ $e'$ $e^2$. Said shanks and tines belonging to each member are made continuous with each other, each connected pair of tines being joined together by U-shaped bends $d^3$ $e^3$ at their outer ends. In this construction the extremities $d^4$ $e^4$ of the outermost tines $d^2$ $e^2$ are brought against the outer surface of the inner tines and the members are connected by a pivot-pin F, passing through the several tines adjacent to the shanks, in the manner illustrated.

The tines of the two members are so bent as to extend or reach past each other when closed as necessary in such crimping-tongs to secure the desired action thereof.

As shown in Figs. 1 and 2, the tine $a'$ is brought into proper position with relation to the tines $b'$ $b^2$ by means of U-shaped bends or offsets in the tines adjacent to the pivot C; but, as shown in Figs. 3 and 4, the same result is produced by slight reversed bends $d^5$ $e^5$, formed in the tines adjacent to the pivot F, the tines being in this instance located in the same plane with the shanks at the said pivot-pin, but being bent or deflected beyond the same.

To enable the tines to pass each other and stand in different planes when closed together, the U-shaped bends $d^3$ $e^3$ are bent or inclined with reference to the tines, as clearly seen in the side view, Fig. 3, it being obvious that by this construction the inner tines of each member are adapted to pass between the two tines of the other member when the jaws of the implement are brought together.

Each of the parts or members of the implement, being thus constructed of a single rod or bar of metal bent into the proper shape, the necessity is avoided of any welding the parts to form the forks or tines, as heretofore common in similar implements, and the implement may therefore be constructed with a relatively small amount of hand work and at a reduced cost.

Figs. 5 and 6 illustrate an implement constructed substantially like that shown in Figs. 3 and 4, but containing eight instead of four tines. In this instance the two parts or members of the implement consist of shanks G and H, provided with tines $g'\ g^2\ g^3\ g^4$ and $h'\ h^2\ h^3\ h^4$, respectively. The shank and several tines of each member are formed of a single rod having U-shaped bends $g^5\ g^6\ g^7\ h^5\ h^6\ h^7$. The tines $g'\ h'$ form immediate continuations of the shanks G H, while the outermost tines $g^5\ h^5$ terminate at their ends $g^8\ h^8$ outside of the shanks and engage the pivot-pin I, by which the parts or members of the implement are connected with each other. The intermediate tines $g^2\ g^3\ h^2\ h^3$ are connected with the exterior tines of the members by the bends $g^5\ g^7\ h^5\ h^7$ at the outer ends of the jaws, and said intermediate tines are connected with each other by the bends $g^6\ h^6$, located adjacent to the pivot-pin which connects the parts. The extremities of the several tines or the U-shaped bends connecting the same are bent or inclined in such manner as to allow the several tines of the jaws to pass each other in closing in the same manner as before described in connection with the form of implement shown in Figs. 3 and 4.

All of the forms of implements described contain the common feature of a member consisting of a plurality of tines and a shank formed by means of a single rod, which is provided with one or more bends uniting the tines. The making of the tines in this manner not only enables the implement, in either of the forms described, to be made without welding of the metal, but also affords an implement which is neat and attractive in appearance and durable in character. It will of course be understood that the number of tines employed may be varied without departure from my invention.

I claim as my invention—

A crimping implement comprising two parts or members having shanks and tines, and a pivot-pin connecting the same, one or both of said members consisting of a shank and a plurality of tines formed of a single rod bent to form the tines which latter are united at their outer ends by U-shaped bends one end of said rod terminating at the pivotal joint connecting the parts or members and being there engaged with the said pivot-pin, substantially as described.

In testimony that I claim the foregoing as my invention I affix my signature in presence of two witnesses.

WILLIAM L. T. KUECHEL.

Witnesses:
C. A. NEALE,
C. H. FOSTER.